Patented Oct. 12, 1954

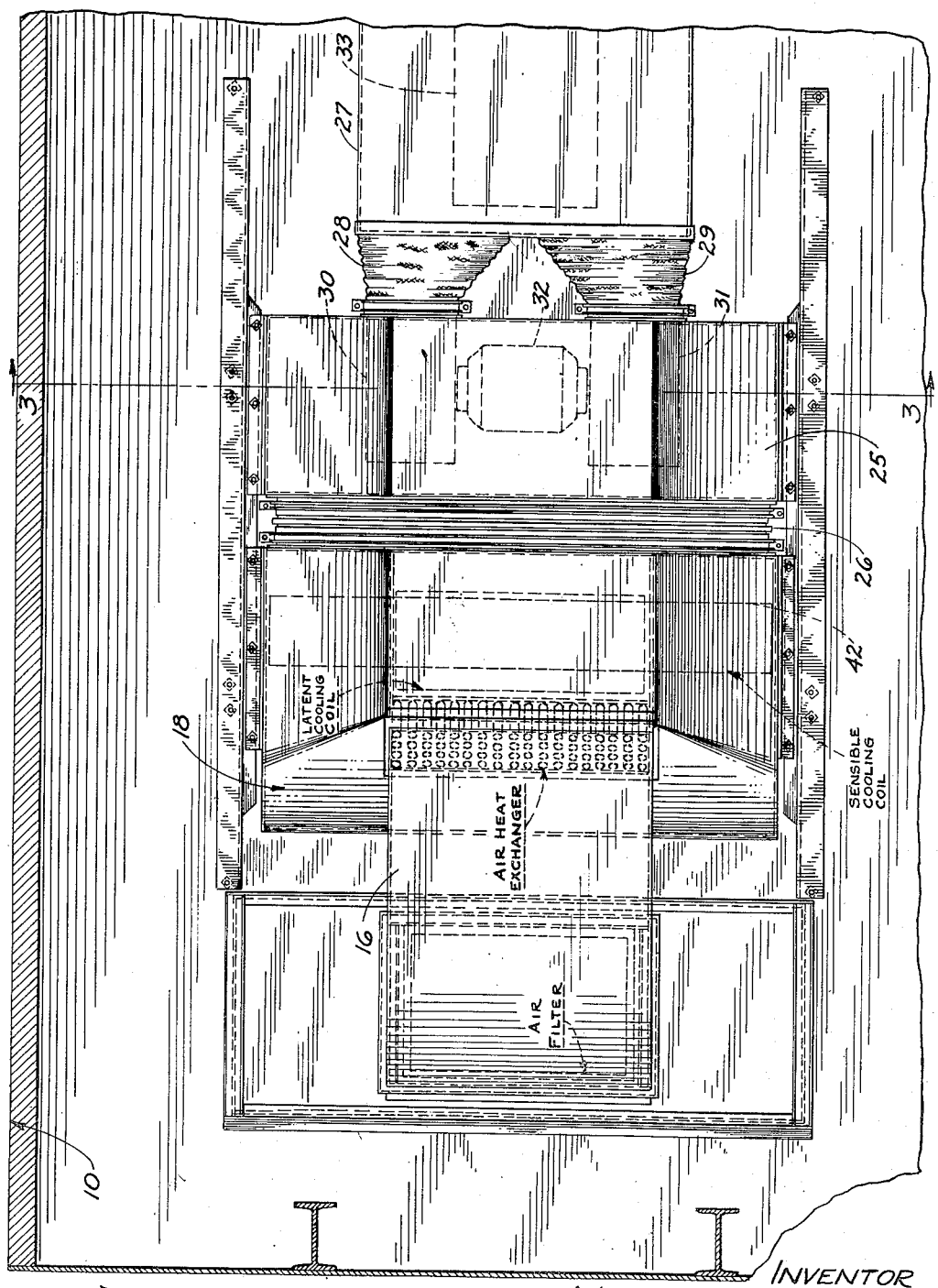

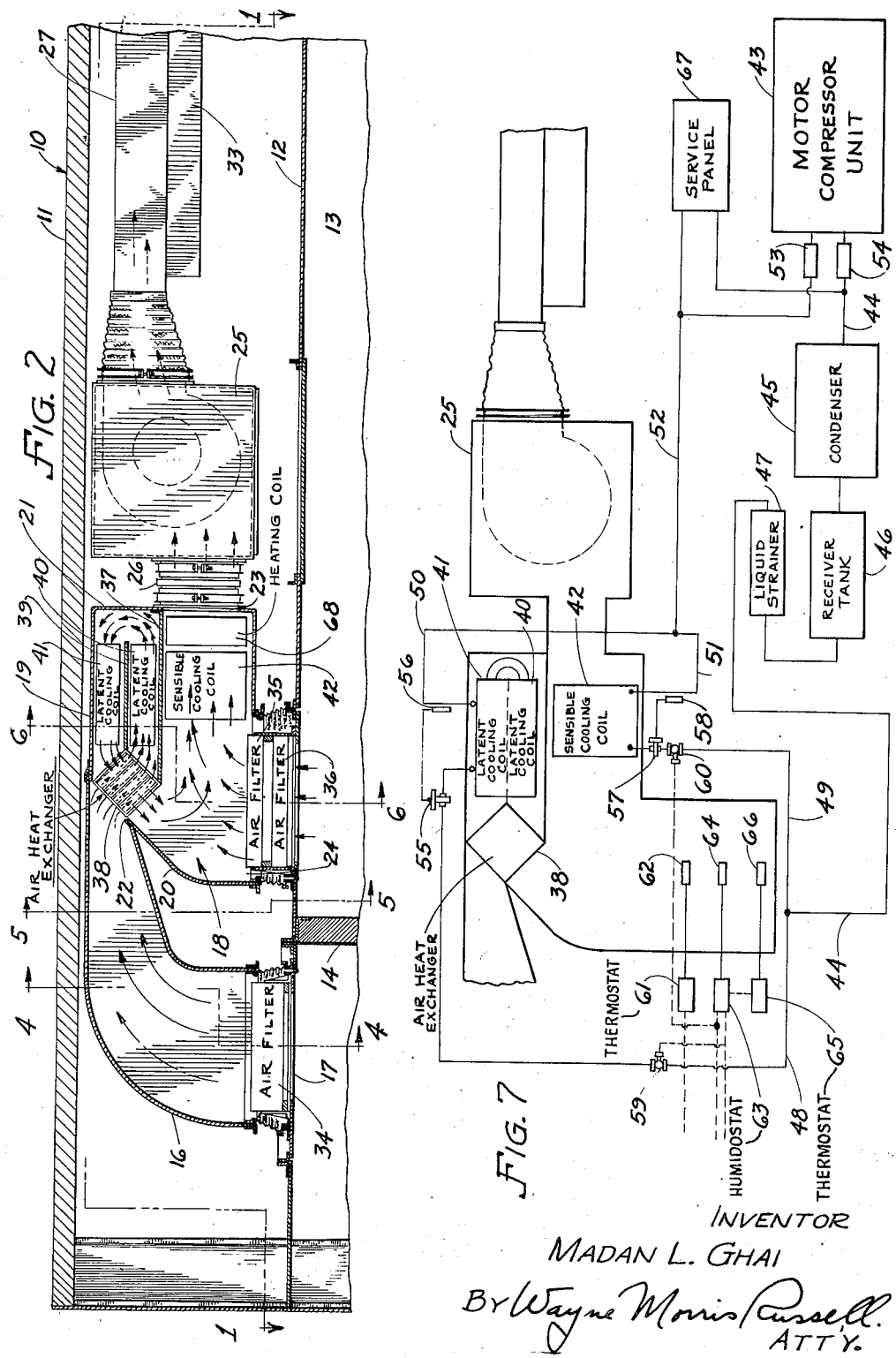

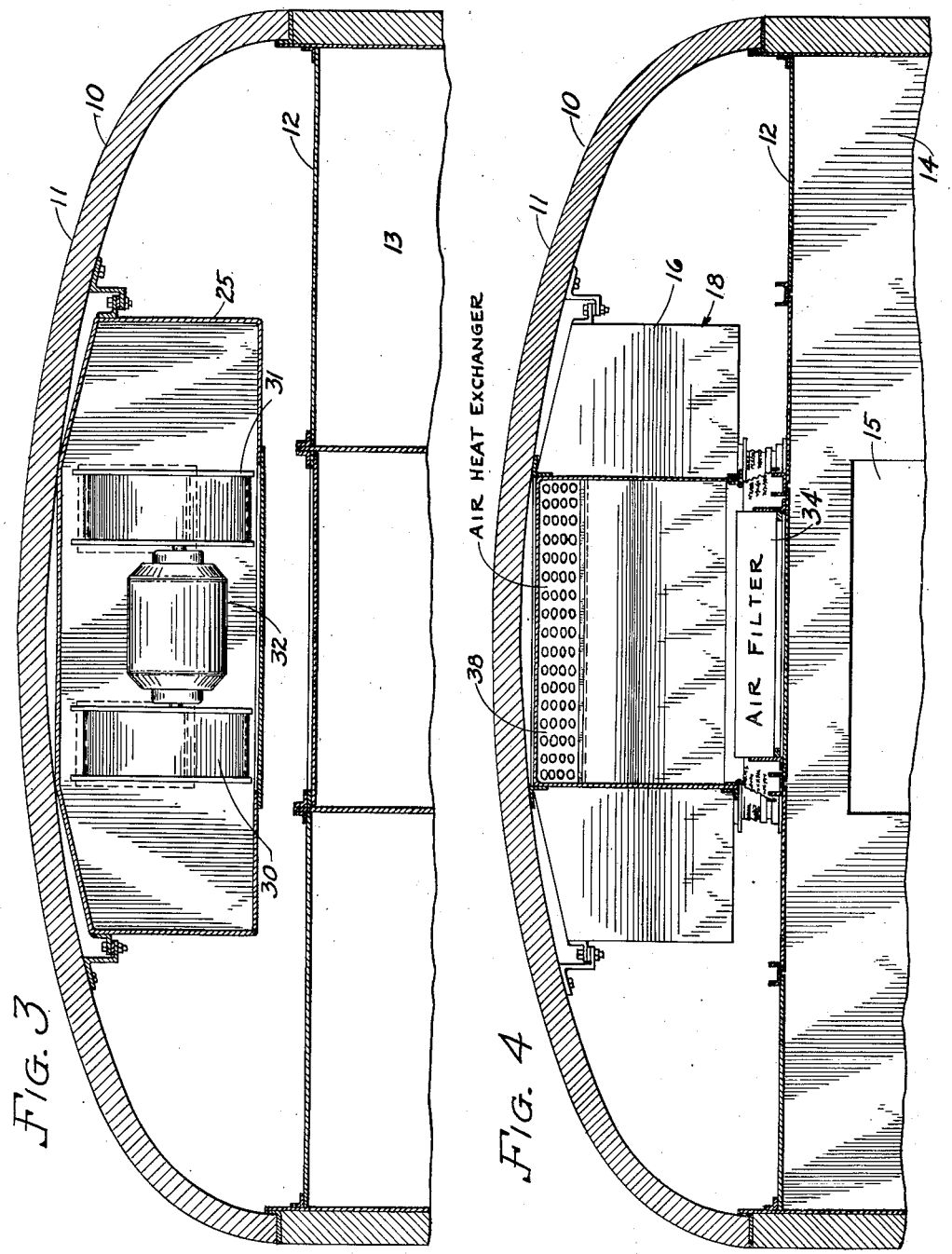

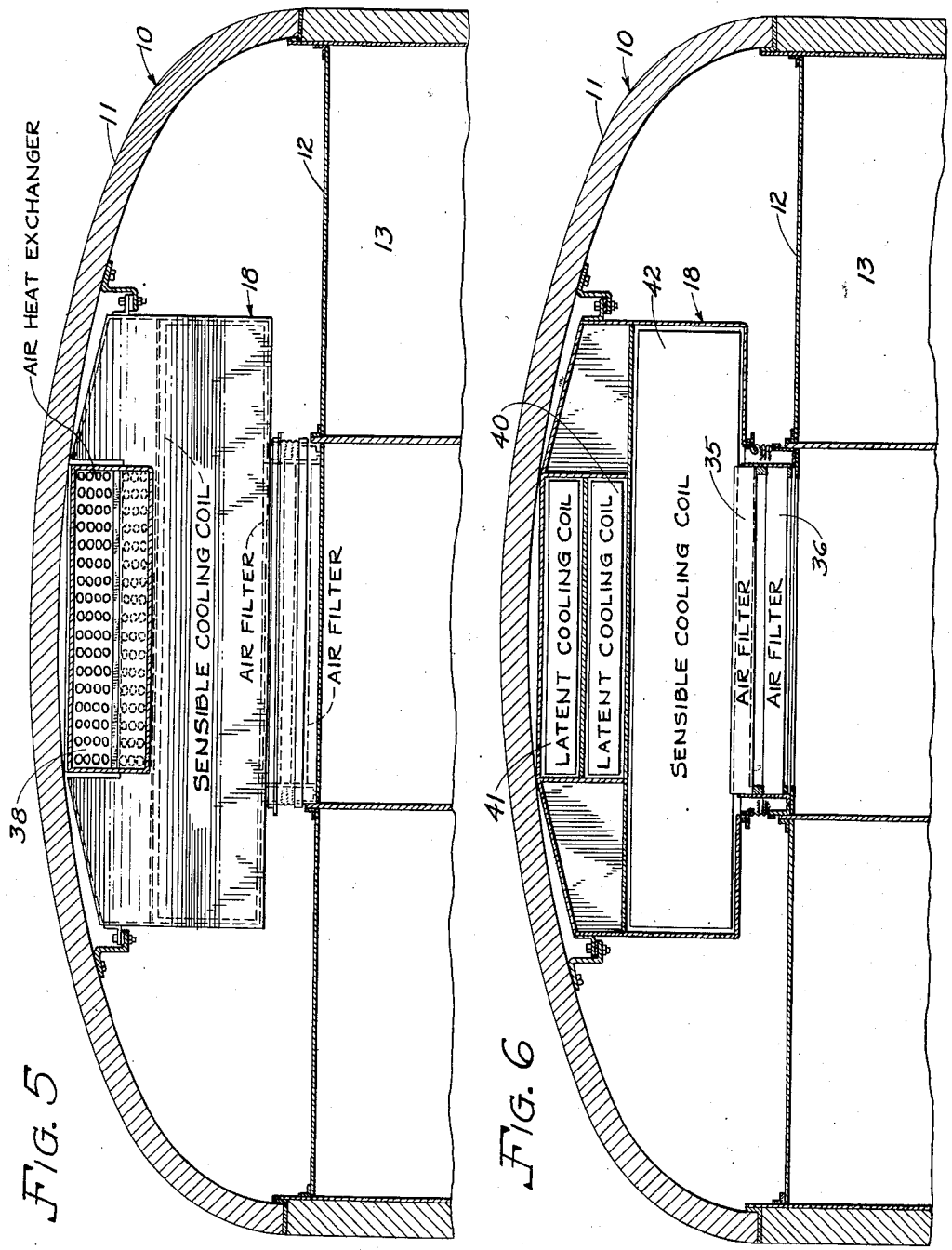

2,691,488

UNITED STATES PATENT OFFICE 2,691,488

SYSTEM OF DEHUMIDIFICATION

Madan L. Ghai, Delhi, India, assignor to Pullman-Standard Car Manufacturing Company, Chicago, Ill., a corporation of Delaware Application October 4, 1951, Serial No. 249,747

11 Claims. (Cl. 236—44)

The invention relates to air conditioning systems and is primarily concerned with a novel apparatus and method for controlling the humidity inside an enclosure in which a number of people are situated.

The principal object of the present invention is to provide a novel apparatus and method for controlling the humidity of the air in the space inside an enclosure.

A more specific object of the present invention is to provide a novel apparatus and method for controlling the humidity of air in the passenger space of a passenger vehicle without the necessity of providing a larger refrigeration capacity than is presently used in conventional passenger vehicle air conditioning systems.

The foregoing and other objects of the invention are attained by the construction and arrangement illustrated in the accompanying drawings, wherein—

Fig. 1 is a top plan view taken along the line 1—1 of Fig. 2 of the air conditioning system of the present invention;

Fig. 2 is a vertical longitudinal cross sectional view of the air conditioning system of the present invention shown installed in a railway passenger car;

Fig. 3 is a vertical transverse cross sectional view taken along the line 3—3 of Fig. 1 and looking in the direction of the arrows and showing the blowers which draw air through the intake and the inlet and discharge it through the outlet, the electric motor for operating the blowers, and the housing for the blowers and the electric motor;

Fig. 4 is a vertical transverse cross sectional view taken along the line 4—4 of Fig. 2 and looking in the direction of the arrows and showing the intake duct which has the fresh air intake, the air filter in the intake, and the heat exchanger;

Fig. 5 is a vertical transverse cross sectional view taken along the line 5—5 of Fig. 2 and looking in the direction of the arrows and showing the air conditioning chamber which has the recirculating air inlet from the passenger space, and the heat exchanger;

Fig. 6 is a vertical transverse cross sectional view taken along the line 6—6 of Fig. 2 and looking in the direction of the arrows and showing the air conditioning chamber which has the recirculating air inlet from the passenger space, the air filters in the inlet, the latent cooling coils, and the sensible cooling coil; and Fig. 7 is a schematic view of the air conditioning system of the present invention showing the service panel, the motor compressor unit, the condenser, the piping connecting the motor compressor unit and the condenser to the latent cooling coils and the sensible cooling coil, the expansion valves in the piping, the solenoid valves in the piping, and the thermostats and the humidistat for controlling the air conditioning system.

The total cooling load in a railway passenger car includes the sensible load and the latent load. The sensible load consists of heat transmitted through walls and doors due to a higher temperature outside of the car than in the passenger space in the car, heat transmitted due to sun effect, and heat given off by passengers. The latent load consists of the moisture given off by the passengers, and the moisture brought into the car with the fresh intake air from the atmosphere or outside of the car. The latent load is independent of the atmospheric temperature or temperature outside of the car and depends largely upon the number of passengers inside the car, in that, the moisture given off by passengers constitutes a large part of the latent load. The maximum load condition in a railway passenger car may be had when the car has a maximum passenger load and the sun is shining and the atmospheric temperature or temperature outside of the car is 95° F. or higher. The minimum load condition in a railway passenger car may be had when the car has a maximum passenger load and the sun is not shining and the atmospheric temperature or temperature outside of the car is the same or lower than the temperature in the passenger space of the car.

In the art of air conditioning railway passenger cars it has been the practice heretofore to pass fresh air through a heat exchanger and then to pass said fresh air through a latent cooling coil and then back through the heat exchanger, and then to pass said fresh air into a plenum chamber where it was mixed with recirculated air from the passenger space of the car. This mixture of fresh air and recirculated air was then passed through a sensible cooling coil and then the mixture passed through an outlet into the passenger space of the car. The latent cooling coil and the sensible cooling coil were kept cold by a compression refrigeration cycle. The sensible cooling coil and the latent cooling coil were operated simultaneously, that is, the latent cooling coil was operated at all times, even under maximum load conditions, and the sensible cooling coil was operated at all times except at minimum load condition. The fact is that the humidity in the passenger space never becomes too high under maximum load conditions because the sensible load will be high and this means that the percentage of latent load will not be high, which means that there will be an average humidity in the passenger space of the car. Therefore, the fact that both the latent cooling coil and the sensible cooling coil are operating at maximum load conditions is unnecessary, because at maximum load condition the humidity in the passenger space of the car is satisfactory. The capacity of the refrigeration unit in railway passenger cars presently in use is cut down considerably due to the fact that the latent cooling coil operates at maximum load condition.

The invention proposes an air conditioning system for a railway passenger car in which fresh air is passed through a heat exchanger and then through a latent cooling coil and then back through the heat exchanger. This fresh air is then mixed with recirculated air from the passenger space and this mixture is passed through a sensible cooling coil and then the mixture is passed through an outlet into the passenger space of the car. The latent cooling coil and the sensible cooling coil are kept cold by a compression refrigeration cycle. Under conditions of average humidity in the passenger space the latent cooling coil is inoperative and the sensible cooling coil is operative, and the fresh air will pass through the heat exchanger and through the latent cooling coil and back through the heat exchanger without any change in its condition. The fresh air then mixes with the recirculated air from the passenger space and this mixture goes through the sensible cooling coil where it is cooled, and the mixture goes through the outlet into the passenger space. Upon reaching a condition of high humidity in the passenger space, the latent cooling coil will become operative and the sensible cooling coil will become inoperative at the instant the latent cooling coil becomes operative, and the fresh air will pass through the heat exchanger and through the latent cooling coil, where it is cooled, and then the fresh air will pass back through the heat exchanger where it will take up heat from the fresh air entering the heat exchanger for the first time. This fresh air will mix with the recirculated air from the passenger space and this mixture will go through the sensible cooling coil without any change in its condition. This mixture will then go through the outlet into the passenger space. The latent cooling coil and the sensible cooling coil are never in operation at the same time. Since the latent cooling coil is inoperative at maximum load condition, the maximum capacity of the refrigeration unit is not reduced. Therefore, this system can be applied to railway passenger cars presently in use without changing the refrigeration unit.

In the drawings, an enclosure or passenger vehicle or railway passenger car is designated 10 and has a roof 11 and a ceiling 12 in spaced relation below the roof 11, and an air space or passenger space 13 below the ceiling 12. The railway passenger car 10 has a wall 14 at the vestibule end thereof which supports a body end door 15. An intake duct 16 is positioned between the roof 11 and the ceiling 12 at the vestibule end of the railway passenger car 10 and is fixedly secured to the ceiling 12. The intake duct 16 has a fresh air intake 17 which is in communication with the atmosphere and is adapted to receive fresh air. An air conditioning chamber 18 is positioned between the roof 11 and the ceiling 12 and is fixedly secured to the roof 11. The air conditioning chamber 18 has a wall 19 and closed ends 20 and 21 and is provided with an opening 22 in the closed end 20 thereof adjacent one side of the wall 19 and is provided with an opening 23 in the closed end 21 thereof adjacent the opposite side of the wall 19, and is provided with an inlet 24 between the openings 22 and 23 which is in communication with the passenger space 13. The intake duct 16 and the air conditioning chamber 18 are secured together and the opening 22 provides communication between the intake duct 16 and the air conditioning chamber 18. A housing 25 is positioned between the roof 11 and the ceiling 12 and is fixedly secured to the roof 11. A flexible connection 26 extends between the air conditioning chamber 18 and the housing 25, and the opening 23 provides communication between the air conditioning chamber 18 and the housing 25. An air distributing duct 27 is positioned longitudinally in the railway passenger car 10 between the roof 11 and ceiling 12, and a pair of flexible connections 28 and 29 are secured to the air distributing duct 27 and extend between and establish communication between the housing 25 and the air distributing duct 27. The air distributing duct 27 has a plurality of outlets in communication with the passenger space 13 in the railway passenger car 10. A pair of blowers 30 and 31 are positioned in the housing 25 and are driven by an electric motor 32 positioned between them. The blowers 30 and 31 are adapted to draw atmospheric or fresh air into the fresh air intake 17 and are adapted to draw air from the passenger space 13 through the inlet 24, into the air conditioning chamber 18 at an increased velocity and discharge all of the air through the outlets in the air distributing duct 27 into the passenger space 13. An exhaust duct 33 serves to exhaust excess air from the passenger space 13. An air filter 34 is secured in the fresh air intake 17 and a pair of air filters 35 and 36 are secured in the inlet 24.

A first partition 37 is positioned longitudinally in the air conditioning chamber 18 and has one end secured to the closed end 21 adjacent the opening 23 and has its other end spaced from the closed end 20. An air-to-air heat exchanger or heat interchanger 38 is positioned transversely of and within the air conditioning chamber 18 in the space between said other end of the first partition 37 and the closed end 20 and is in contact with the first partition 37 and the closed end 20, as best shown in Fig. 2. A second partition 39 is positioned longitudinally in the air conditioning chamber 18 on one side of the first partition 37 and in spaced relation with respect to the first partition 37, and the second partition 39 has one end in contact with the heat exchanger 38 and has its other end spaced from the closed end 21. A first cooling element or latent cooling coil 40 is positioned in the air conditioning chamber 18 between the first partition 37 and one side of the second partition 39. A second cooling element or latent cooling coil 41 is positioned in the air conditioning chamber 18 on the other side of the second partition 39. A third cooling element or sensible cooling coil 42 is positioned in the air conditioning chamber 18 on the other side of the first partition 37 between the inlet 24 and the opening 23.

A motor compressor unit 43 is adapetd to be positioned under the railway passenger car 10 and is adapted to pump a refrigerant in a main liquid line 44. The main liquid line 44 leads from the motor compressor unit 43 to a condenser 45 and then to a receiver tank 46 and then to a liquid strainer 47, and then it branches out into branch lines 48 and 49. The branch line 48 leads to the first and second cooling elements or latent cooling coils 40 and 41, and the branch line 49 leads to the third cooling element or sensible cooling coil 42. A branch line 50 leads from the first and second cooling elements or latent cooling coils 40 and 41, and a branch line 51 leads from the third cooling element or sensible cooling coil 42, and the branch lines 50 and 51 join into a main suction line 52 which leads to the motor compressor unit 43. The motor compressor unit 43 has a pair of vibration eliminators 53 and 54 which keep the vibration from the motor compressor unit 43 from going into the lines 44 and 52. The branch line 48 has an expansion valve 55 therein which has a thermal bulb 56 in contact with the branch line 50. The expansion valve 55 limits the amount of liquid admitted to the latent cooling coils 40 and 41, depending upon the temperature in the branch line 50. The branch line 49 has an expansion valve 57 therein which has a thermal bulb 58 in contact with the branch line 51. The expansion valve 57 limits the amount of liquid admitted to the sensible cooling coil 42, depending upon the temperature in the branch line 51. A solenoid valve 59 is positioned in the branch line 48 and opens and closes to start the flow of liquid to or stop the flow of liquid to the latent cooling coils 40 and 41. A solenoid valve 60 is positioned in the branch line 49 and opens and closes to start the flow of or stop the flow of liquid to the sensible cooling coil 42. A dry bulb thermostat 61 has a thermal bulb 62 positioned in the path of the recirculating air from the passenger space 13, and the thermostat 61 is connected to the motor compressor unit 43 and functions to turn the motor compressor unit 43 on or off when certain temperatures in the passenger space 13 are reached, as will be later described. Means responsive to the condition of air in the form of a humidistat 63, having a wet control bulb 64, is positioned in the path of the recirculating air from, or in communication with, the passenger space 13. Means responsive to the condition of air in the form of a dry bulb thermostat 65 having a thermal bulb 66 is positioned in the path of the recirculating air from, or in communication with, the passenger space 13. The humidistat 63 and the thermostat 65 are connected together and to the solenoid valve 59 in the branch line 48, and the humidistat 63 and thermostat 65 are also connected to the solenoid valve 60 in the branch line 49. The latent cooling coils 40 and 41 together have a 5 ton or 1000 B. t. u./min. refrigeration capacity, and the sensible cooling coil 42 has an 8 ton or 1600 B. t. u./min. refrigeration capacity. These refrigeration capacities are merely illustrative and are subject to wide variation. The latent cooling coils 40 and 41 operate at a suction temperature of 30 to 35° F. and the sensible cooling coil 42 operates at a suction temperature of 45° F. These temperatures are merely illustrative and may be varied. A service panel 67 is mounted inside the railway passenger car 10 and is connected to the main liquid line 44 and is connected to the main suction line 52. The service panel 67 has a plurality of pressure switches and pressure gauges thereon in order to measure the pressure in the main liquid line 44 and the main suction line 52.

Fresh intake air from the atmosphere enters through the fresh air intake 17 at the rate of 500 cubic feet per minute, which is merely illustrative, and goes through the air filter 34 and the heat exchanger or heat interchanger 38 and through the latent cooling coil 40, around said other end of the second partition 39, and through the latent cooling coil 41 and back through the heat exchanger or heat interchanger 38, and then mixes with recirculating air from the passenger space 13 which comes through the air filters 35 and 36 into the inlet 24 at the rate of 1500 cubic feet per minute, which is merely illustrative, and then the mixture of fresh air and recirculated air goes through the sensible cooling coil 42 and then the mixture goes through the outlet and into the passenger space 13. It is to be noted that the latent cooling coils 40 and 41 and the sensible cooling coil 42 are only for spring, summer, and autumn operation. A heating coil 68 is positioned in the air conditioning chamber 18 and is turned on only in the winter.

The mode of operation of the air conditioning system is as follows:

Proceeding from minimum load condition to maximum load condition, upon reaching a temperature of 74° F. in the passenger space 13, the thermostat 61 will turn on the motor compressor unit 43, and the humidistat 63 and thermostat 65 will open the solenoid valve 59 to the latent cooling coils 40 and 41, rendering them operative and effective. Upon reaching a temperature of 76° F. in the passenger space 13, the humidistat 63 and the thermostat 65 will close the solenoid valve 59 and open the solenoid valve 60, rendering the latent cooling coils 40 and 41 inoperative and inffective and the sensible cooling coil 42 operative and effective. Proceeding from maximum load condition to minimum load condition, at maximum load condition the sun is shining and the amount of sensible heat will be high, and therefore the humidity will be average—that is—the humidity will be pleasing to the passengers in the passenger space 13. Assuming the temperature in the passenger space 13 to be 76° F. or above, the sensible cooling coil 42 will be in operation, that is, the humidistat 63 and the thermostat 65 will have the solenoid valve 60 open and the solenoid valve 59 closed at this temperature. Upon reaching a temperature of 74° F. in the passenger space 13, the humidistat 63 and thermostat 65 will close the solenoid valve 60 and open the solenoid valve 59, rendering the sensible cooling coil 42 inoperative and ineffective and rendering the latent cooling coils 40 and 41 operative and effective. Upon reaching a temperature of 72° F. in the passenger space 13, the humidistat 63 and the thermostat 65 will close the solenoid valve 59 and keep the solenoid valve 60 closed, and will render the latent cooling coils 40 and 41 and the sensible cooling coil 42 inoperative and ineffective. Upon reaching a temperature of 72° F. in the passenger space 13, the thermostat 61 will shut off the motor compressor unit 43. The temperatures at which the motor compressor unit 43, the latent cooling coils 40 and 41, and the sensible cooling coil 42 go off and on are merely illustrative and may be varied according to climatic conditions. During the stage between minimum load condition and maximum load condition, the sensible cooling coil 42 will be on part of the time and the latent cooling coils 40 and 41 will be on part of the time, but the latent cooling coils 40 and 41 are never in operation when the sensible cooling coil 42 is in operation. When the latent cooling coils 40 and 41 go on, the sensible cooling coil 42 goes off, and vice versa.

From the foregoing it will be seen that there has been provided an air conditioning system in which the latent cooling coils are never in operation when the sensible cooling coil is in operation, and vice versa, from which it follows that the latent cooling coils will not be operating at maximum load condition when no dehumidification is necessary, because the sensible heat is high enough that there will be a condition of average humidity in the passenger space. Thus, this air conditioning system may be installed without increasing the refrigeration capacity of railway passenger cars presently in use.

What is claimed is:

1. The method of controlling the humidity in the space inside an enclosure comprising the steps of passing fresh air through a heat exchanger, then passing said fresh air through a first cooling element, then passing said fresh air back through said heat exchanger, then mixing said fresh air with air from the space inside the enclosure, then passing the mixture through a second cooling element, rendering said first cooling element and said heat exchanger ineffective and said second cooling element effective under conditions of average humidity inside the enclosure, rendering said first cooling element and said heat exchanger effective and said second cooling element ineffective under conditions of high humidity inside the enclosure, and then passing said mixture into the enclosure.

2. The method of controlling the humidity in the passenger space of a passenger vehicle comprising the steps of passing fresh air through a heat exchanger, then passing said fresh air through a latent cooling coil, then passing said fresh air back through said heat exchanger, then mixing said fresh air with air from the passenger space of said passenger vehicle, then passing the mixture through a sensible cooling coil, rendering said latent cooling coil and said heat exchanger ineffective and said sensible cooling coil effective under conditions of average humidity in the passenger space of said passenger vehicle, rendering said latent cooling coil and said heat exchanger effective and said sensible cooling coil ineffective under conditions of high humidity in the passenger space of said passenger vehicle, and then passing said mixture into the passenger space of said passenger vehicle.

3. The method of controlling the humidity in the passenger space of a passenger vehicle having an air conditioning chamber having a fresh air intake and having an inlet in communication with the passenger space of said passenger vehicle and having an outlet in communication with the passenger space in said passenger vehicle comprising the steps of drawing fresh air into said fresh air intake at an increased velocity, passing said fresh air through a heat exchanger, then passing said fresh air through a latent cooling coil, then passing said fresh air back through said heat exchanger, drawing air from the passenger space of said passenger vehicle into said inlet at an increased velocity, then mixing said fresh air with the air drawn in through said inlet, then passing the mixture through a sensible coiling coil, rendering said latent cooling coil and said heat exchanger ineffective and said sensible cooling coil effective under conditions of average humidity in the passenger space of said passenger vehicle, rendering said latent cooling coil and said heat exchanger effective and said sensible cooling coil ineffective under conditions of high humidity in the passenger space of said passenger vehicle, and then forcing said mixture through said outlet into the passenger space of said passenger vehicle.

4. In combination, an enclosure provided with an air conditioning chamber provided with a fresh air intake and provided with an outlet in communication with the air space in said enclosure and provided with an inlet between said fresh air intake and said outlet in communication with the air space in said enclosure, a heat exchanger positioned in said air conditioning chamber between said fresh air intake and said inlet, a first cooling element positioned in said air conditioning chamber adjacent said heat exchanger and said inlet, a second cooling element positioned in said air conditioning chamber between said inlet and said outlet, means for passing air through said fresh air intake and said inlet into said air conditioning chamber and discharging it through said outlet into the air space in said enclosure, and means responsive to the condition of air in communication with the air space in said enclosure rendering said first cooling element and said heat exchanger ineffective and said second cooling element effective under conditions of average humidity in the air space in said enclosure and rendering said first cooling element and said heat exchanger effective and said second cooling element ineffective under conditions of high humidity in the air space in said enclosure.

5. In a passenger vehicle provided with an air conditioning chamber provided with a fresh air intake and provided with an outlet in communication with the passenger space in said passenger vehicle and provided with an inlet between said fresh air intake and said outlet in communication with the passenger space in said passenger vehicle, a heat exchanger positioned in said air conditioning chamber between said fresh air intake and said inlet, a latent cooling coil positioned in said air conditioning chamber adjacent said heat exchanger and said inlet, a sensible cooling coil positioned in said air conditioning chamber between said inlet and said outlet, means for passing air into said fresh air intake and said inlet into said air conditioning chamber and discharging it through said outlet into the passenger space in said passenger vehicle, and means responsive to the condition of air in communication with the passenger space in said passenger vehicle rendering said latent cooling coil and said heat exchanger ineffective and said sensible cooling coil effective under conditions of average humidity in the passenger space of said passenger vehicle and rendering said latent cooling coil and said heat exchanger effective and said sensible cooling coil ineffective under conditions of high humidity in the passenger space of said passenger vehicle.

6. In combination, an enclosure provided with an air conditioning chamber provided with a fresh air intake and provided with an outlet in communication with the air space in said enclosure and provided with an inlet between said fresh air intake and said outlet in communication with the air space in said enclosure, a heat exchanger positioned in said air conditioning chamber between said fresh air intake and said inlet, a first cooling element positioned in said air conditioning chamber adjacent said heat exchanger and said inlet, a second cooling element positioned in said air conditioning chamber between said inlet and said outlet, means for passing air through said fresh air intake and said inlet into said air conditioning chamber and discharging it through said outlet into the air space in said enclosure, and means connected to said first and second cooling elements and rendering said first cooling element inoperative and said second cooling element operative under conditions of average humidity in the air space in said enclosure and rendering said first cooling element operative and said second cooling element inoperative under conditions of high humidity in the air space in said enclosure.

7. In a passenger vehicle provided with an air conditioning chamber provided with a fresh air intake and provided with an outlet in communication with the passenger space in said passenger vehicle and provided with an inlet between said fresh air intake and said outlet in communication with the passenger space in said passenger vehicle, a heat exchanger positioned in said air conditioning chamber between said fresh air intake and said inlet, a latent cooling coil positioned in said air conditioning chamber adjacent said heat exchanger and said inlet, a sensible cooling coil positioned in said air conditioning chamber between said inlet and said outlet, means for passing air through said fresh air intake and said inlet into said air conditioning chamber and discharging it through said outlet into the passenger space in said passenger vehicle, and means connected to said latent cooling coil and said sensible cooling coil and rendering said latent cooling coil inoperative and said sensible cooling coil operative under conditions of average humidity in the passenger space of said passenger vehicle and rendering said latent cooling coil operative and said sensible cooling coil inoperative under conditions of high humidity in the passenger space in said passenger vehicle.

8. In combination, an enclosure provided with an air conditioning chamber provided with a fresh air intake and provided with an outlet in communication with the air space in said enclosure and provided with an inlet between said fresh air intake and said outlet in communication with the air space in said enclosure, a heat exchanger positioned in said air conditioning chamber between said fresh air intake and said inlet, a first cooling element positioned in said air conditioning chamber adjacent said heat exchanger and said inlet, a second cooling element positioned in said air conditioning chamber between said inlet and said outlet, a blower positioned in said air conditioning chamber between said second cooling element and said outlet and adapted to draw air through said fresh air intake and said inlet into said air conditioning chamber and discharge it through said outlet into the air space in said enclosure, and means responsive to the condition of air in communication with the air space in said enclosure rendering said first cooling element and said heat exchanger ineffective and said second cooling element effective under conditions of average humidity in the air space in said enclosure and rendering said first cooling element and said heat exchanger effective and said second cooling element ineffective under conditions of high humidity in the air space in said enclosure.

9. In a passenger vehicle provided with an air conditioning chamber provided with a fresh air intake and provided with an outlet in communication with the passenger space in said passenger vehicle and provided with an inlet between said fresh air intake and said outlet in communication with the passenger space in said passenger vehicle, a heat exchanger positioned in said air conditioning chamber between said fresh air intake and said inlet, a latent cooling coil positioned in said air conditioning chamber adjacent said heat exchanger and said inlet, a sensible cooling coil positioned in said air conditioning chamber between said inlet and said outlet, a blower positioned in said air conditioning chamber between said sensible cooling coil and said outlet and adapted to draw air through said fresh air intake and said inlet into said air conditioning chamber and discharge it through said outlet into the passenger space of said passenger vehicle, and means responsive to the condition of air in communication with the passenger space in said passenger vehicle rendering said latent cooling coil and said heat exchanger ineffective and said sensible cooling coil effective under conditions of average humidity in the passenger space in said passenger vehicle and rendering said latent cooling coil and said heat exchanger effective and said sensible cooling coil ineffective under conditions of high humidity in the passenger space in said passenger vehicle.

10. In combination, an enclosure provided with an air conditioning chamber having a wall and having both ends closed and provided with a fresh air intake in one closed end thereof adjacent one side of said wall and provided with an outlet in the other closed end thereof adjacent the opposite side of said wall in communication with the air in the space inside said enclosure and provided with an inlet between said fresh air intake and said outlet in communication with the air in the space inside said enclosure, means for passing air through said fresh air intake and said inlet into said air conditioning chamber and discharging it through said outlet into the space inside said enclosure, a first partition positioned longitudinally in said air conditioning chamber and having one end secured to said other closed end of said air conditioning chamber adjacent said outlet and having its other end spaced from said one closed end of said air conditioning chamber, a heat exchanger positioned transversely of and within said air conditioning chamber in the space between said other end of said first partition and said one closed end of said air conditioning chamber and in contact with said first partition and said one closed end of said air conditioning chamber, a second partition positioned longitudinally in said air conditioning chamber on one side of said first partition and in spaced relation with respect to said first partition and having one end in contact with said heat exchanger and having its other end spaced from said other closed end of said air conditioning chamber, a first cooling element positioned in said air conditioning chamber between said first partition and one side of said second partition, a second cooling element positioned in said air conditioning chamber on the other side of said second partition, a third cooling element positioned in said air conditioning chamber on the other side of said first partition between said inlet and said outlet, the fresh air entering through said fresh air intake and going through said heat exchanger and through said first cooling element around said other end of said second partition and through said second cooling element and back through said heat exchanger and mixing with the air from said inlet and then going through said third cooling element and through said outlet into the space inside said enclosure, and means responsive to the condition of air in communication with the air in the space inside said enclosure rendering said first and second cooling elements and said heat exchanger ineffective and said third cooling element effective under conditions of average humidity in the air in the space inside said enclosure and rendering said first and second cooling elements and said heat exchanger effective and said third cooling element ineffective under conditions of high humidity in the air in the space inside said enclosure.

11. In a passenger vehicle provided with an air conditioning chamber having a wall and having both ends closed and provided with a fresh air intake in one closed end thereof adjacent one side of said wall and provided with an outlet in the other closed end thereof adjacent the opposite side of said wall in communication with the passenger space in said passenger vehicle and provided with an inlet between said fresh air intake and said outlet in communication with the passenger space in said passenger vehicle, means for passing air through said fresh air intake and said inlet into said air conditioning chamber and discharging it through said outlet into the passenger space of said passenger vehicle, a first partition positioned longitudinally in said air conditioning chamber and having one end secured to said other closed end of said air conditioning chamber adjacent said outlet and having its other end spaced from said one closed end of said air conditioning chamber, a heat exchanger positioned transversely of and within said air conditioning chamber in the space between said other end of said first partition and said one closed end of said air conditioning chamber and in contact with said first partition and said one closed end of said air conditioning chamber, a second partition positioned longitudinally in said air conditioning chamber on one side of said first partition and in spaced relation with respect to said first partition and having one end in contact with said heat exchanger and having its other end spaced from said other closed end of said air conditioning chamber, a first latent cooling coil positioned in said air conditioning chamber between said first partition and one side of said second partition, a second latent cooling coil positioned in said air conditioning chamber on the other side of said second partition, a sensible cooling coil positioned in said air conditioning chamber on the other side of said first partition between said inlet and said outlet, the fresh air entering through said fresh air intake and going through said heat exchanger and through said first latent cooling coil around said other end of said second partition and through said second latent cooling coil and back through said heat exchanger and mixing with the air from said inlet and then going through said sensible cooling coil and through said outlet into the passenger space of said passenger vehicle, and means responsive to the condition of air in communication with the air in the passenger space in said passenger vehicle rendering said first latent cooling coil and said second latent cooling coil and said heat exchanger ineffective and said sensible cooling coil effective under conditions of average humidity in the passenger space in said passenger vehicle and rendering said first latent cooling coil and said second latent cooling coil and said heat exchanger effective and said sensible cooling coil ineffective under conditions of high humidity in the passenger space in said passenger vehicle.

References Cited in the file of this patent

UNITED STATES PATENTS

| Number | Name | Date |
|---|---|---|
| 2,093,968 | Kettering | Sept. 21, 1937 |
| 2,123,076 | Madden | July 5, 1938 |
| 2,139,262 | Euwer | Dec. 6, 1938 |
| 2,236,190 | Wolfert | Mar. 25, 1941 |
| 2,237,332 | Bretzloff | Apr. 8, 1941 |
| 2,256,350 | Nystrom | Sept. 16, 1941 |
| 2,301,725 | Wile | Nov. 10, 1942 |
| 2,477,826 | Ringquist | Aug. 2, 1949 |